No. 889,367. PATENTED JUNE 2, 1908.
E. J. HANSEN.
POT COVER.
APPLICATION FILED JULY 13, 1907.
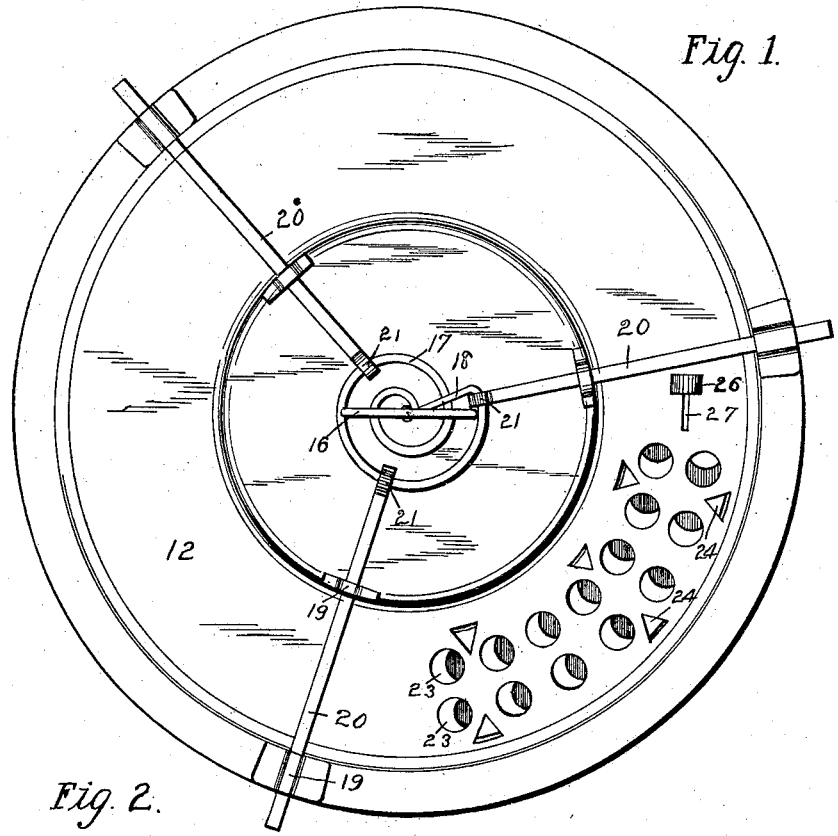
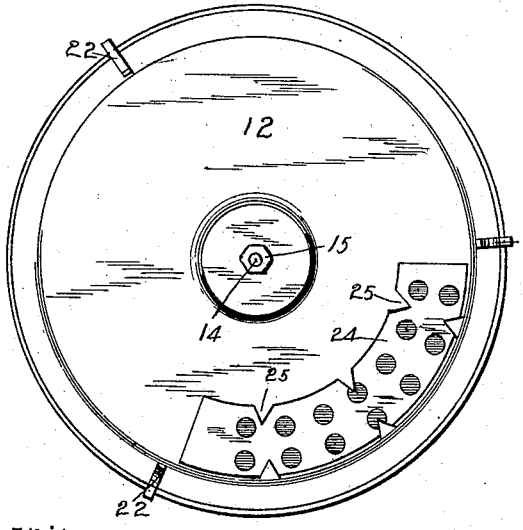
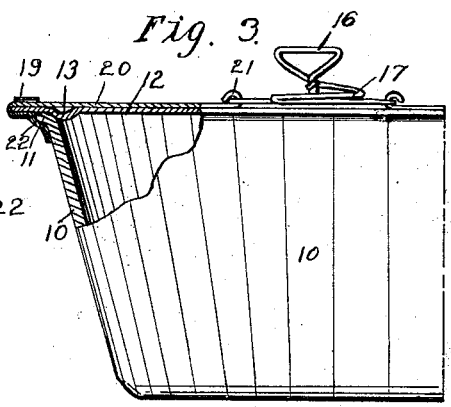
Witnesses.
B. C. Dahlberg.
P. H. Decker.
Inventor.
E. J. Hansen.
by Owig & Law Atty's

UNITED STATES PATENT OFFICE.

EBBE J. HANSEN, OF EXIRA, IOWA.

POT-COVER.

No. 889,367.  Specification of Letters Patent.  Patented June 2, 1908.

Application filed July 13, 1907. Serial No. 383,618.

*To all whom it may concern:*

Be it known that I, EBBE J. HANSEN, a citizen of the United States, residing at Exira, in the county of Audubon and State of Iowa, have invented a certain new and useful Pot-Cover, of which the following is a specification.

The object of my invention is to provide a cover for a culinary vessel or the like designed to be quickly and easily attached to a vessel and to be firmly and immovably held thereon in such a manner as to form as near a steam tight joint as possible, and also to provide a vent device in the cover, which may be so attached as to permit the escape of steam in such quantities as may be desired, to the end that a great volume of steam may be retained in the vessel. Further, to provide a cover of this kind that when attached to the vessel will be so firmly retained that the operator may invert the vessel and permit the escape of water through the vent openings while retaining the solid contents of the vessel, and my object is further to provide a simple, inexpensive and easily operated means for attaching and releasing the cover from the vessel.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a top or plan view of a cover embodying my invention. Fig. 2 shows an inverted plan view of the same. Fig. 3 shows a side elevation of a vessel having my improved cover applied thereto a part of the vessel and cover being broken away to show the interior construction.

Referring to the accompanying drawings I have used the reference numeral 10 to indicate the vessel, provided at its top edge with an outwardly projecting flange 11, the vessel and flange being of the ordinary type now in use. The cover proper comprises a body portion 12 preferably made of sheet metal, circular in shape and provided near its periphery with a downwardly inclined rib 13, to engage the inner portion of the vessel 12, the margin of said cover being designed to project over the top of the vessel. Rotatively mounted in the center of the cover 12 is a rod 14 held in place by means of a nut 15, on its under end below the cover. On the top of the rod 14 is a handle 16 and fixed to the rod 14 is a cam device formed by a single piece of wire or other material of spiral form indicated by the numeral 17, and connected at both ends with the rod 14. The upper end portion of the spiral, which is also the part that is first removed from the rod 14, is an extension 18 which is arranged radiable relative to the rod 14.

Formed on or fixed to the top of the cover 12 is a series of guide loops 19 and in each guide loop is a slide bar 20 having on its inner end a loop 21 to encircle the agitator portion of the spiral cam 17 and having on its outer end a hook 22 extending downwardly and in the end shaped to engage the outer lower surface of the flange 11 of the vessel 10.

Formed in the cover 12 near one side thereof is a series of perforations 23 and slidably mounted on the under side of the cover is a perforated plate 24 supported by means of a V-shaped projection 25 forming the cover 12. A handle 26 is connected with the slide 24 projecting upwardly through the slide 27 through the cover.

In practical use I adjust the device, to position for being placed on a vessel, by turning the handle 16 until the cam 17 assumes the position shown in Fig. 1 whereupon all of the slide parts 20 will be at their outer limit of movement, then the cover may be placed on the vessel and the handle 16 turned in the opposite direction thus causing the slide parts to move inwardly and the hook 22 thereon to engage the under surface of the flange 11. These slide parts will move inwardly in unison and when moved to their inner limits will firmly and securely hold the cover to the vessel. The spring action of the cam 17 is such that each hook 22 will be brought in firm contact with the rim of the vessel, even though it is not perfectly round. Furthermore it will tend to hold the cover downwardly into firm contact with the vessel so that a comparatively steam tight joint is provided. Whenever it is desired to permit the escape of steam the slide 24 is moved to position where the openings in it are registered with the openings in the cover, and thus permitting just as much or just as little of the steam to escape as may be desired. If it is desired to drain the water from the articles within the vessel the slide may be adjusted to its open position and the vessel inverted. When in this position it is not necessary for the operator to hold the cover to the vessel by hand as it is firmly held by means of hooks on the slide bars.

Having thus described my invention, what I claim and desire to secure by Letters Patent of the United States therefor, is—

1. In a pot cover, a cover body, a number of slide bars mounted thereon having hooks at their outer ends, loops formed in the inner ends of the slide bars, and a spring cam device attached at one end to the cover body and passed through the loops of the slide bars and operatively connected with a rotatable handle for jointly operating the slide bars.

2. In a pot cover, a cover body, a number of slide bars mounted thereon, having hooks at the outer ends, and a spring cam device, operatively connected with the slide bars and the cover body and adapted to move the slide bars jointly inwardly and outwardly and to hold them in firm contact with the rim of the vessel even though it is not perfectly round.

EBBE J. HANSEN.

Witnesses:
J. B. J. LOHNER,
T. M. RASMUSSEN.